INVENTORS:
Gerhard Ritter, Hans Gött
and Josef Ritter,

BY *Ernest F. Marmorek*

Their ATTORNEY.

Feb. 24, 1970     G. RITTER ET AL     3,497,659
METHOD OF SEQUENTIALLY MANUFACTURING WIRE MESHES HAVING
DIFFERENT TRANSVERSE WIRE SPACINGS
Filed April 6, 1967     6 Sheets-Sheet 5

INVENTORS:
Gerhard Ritter, Hans Götll
and Josef Ritter

BY *Ernest D. Marmorek*

Their ATTORNEY.

United States Patent Office 3,497,659
Patented Feb. 24, 1970

3,497,659
METHOD OF SEQUENTIALLY MANUFACTURING WIRE MESHES HAVING DIFFERENT TRANSVERSE WIRE SPACINGS
Gerhard Ritter, Hans Gött, and Josef Ritter, Styria, Austria, assignors to EVG Entwicklungs-u. Verwertungsgesellschaft m.b.H., Styria, Austria, a corporation of Austria
Filed Apr. 6, 1967, Ser. No. 629,031
Claims priority, application Austria, Apr. 7, 1966,
A 3,378/66
Int. Cl. B23k 11/00
U.S. Cl. 219—56                                    10 Claims

ABSTRACT OF THE DISCLOSURE

A combined double-step and single-step wire mesh welding machine admits of setting between the two different types of steps, and provides for varying the distance between the wires of the double-step set-up from the respective electrodes as compared to the spacing of the single wire from its respective single electrode during the single-step set-up. The method provides for the respective re-setting between these two arrangements.

---

In electrical wire mesh welding machines operating by point welding, continuous longitudinal wires are usually drawn from reels and led parallel to each other spaced apart by the amount of the desired longitudinal wire spacing to the welding electrodes. The transverse wires are introduced, or "shot in," from the side of the machine at a certain distance from the welding electrodes. The longitudinal wires, together with the newly shot-in transverse wire, are then advanced in the machine until the crossing points of the wires are in line with a row of electrodes extending transversely across the width of the machine, whereupon the welding is done. It is also known to shoot in two or more transverse wires simultaneously from the side of the machine. These transverse wires are then advanced, two or more at the same time, towards the rows of electrodes, whereupon the transverse wires are welded at the crossing points to the longitudinal wires either by single-point welding or by double-point welding.

In the so-called single-step machines, in to which only one transverse wire is shot at a time, the transverse wire is advanced as far as the welding electrodes and is then welded at all the cross points to the longitudinal wires, and these machines have the advantage that it is quite easy and structurally simple to change the machine over rapidly to any desired transverse wire spacing. On the other hand however these machines have the disadvantage that the output of welded mesh is relatively slow.

The double-step machines give twice the rate of output for a given speed of welding. In these machines two transverse wires are shot in at the same time, and are advanced together to the welding electrodes, and are welded to the longitudinal wires at the crossing points simultaneously along two welding rows. However in the case of these double-step machines the changing over to a different transverse wire spacing is a considerably more complicated operation, compared to the single-step machines, and usually consumes a great deal of time, quite apart from the fact that a considerable mechanical complexity and consequent unreliability is involved in making these machines adjustable to give different transverse wire spacings.

In regard to production programmes, the usual situation is that by far the greatest requirement is for wire mesh welded to a definite and even spacing, which will in what follows be called the "main spacing," whereas wire mesh with other spacings, which will be called "subsidiary spacings," is much less often required, and in smaller quantities, and moreover the subsidiary spacings are usually a simple multiple of the main spacing.

The object of the invention is to provide a welding process which combines the advantages of the single-step process with those of the double-step process, without having their disadvantages. In this way it is intended to make it possible to produce at a high rate of output wire mesh of a given main spacing, this type of mesh greatly predominating in the production programme, and at the same time to allow the machine to be changed over rapidly and easily to produce wire mesh of any other desired subsidiary spacing.

In accordance with the invention, in a method of sequentially manufacturing lengths of welded wire mesh having different transverse wire spacings by welding continuous longitudinal wires to cut lengths of transverse wires at their crossover points, when making those lengths of the mesh having one main transverse wire spacing two transverse wire are advanced towards the subsidiary welding of insertion mutually spaced by the main spacing, and each at a distance of twice the main spacing, from a corresponding one of two main transverse welding lines, the longitudinal wires together with the two transverse wires are advanced towards the main welding lines through a distance of twice the main spacing, and the transverse wires are welded to the longitudinal wires along the two main welding lines, the cycle being repeated as necessary, whereas when subsequently making lengths of the mesh having other subsidiary transverse wire spacings the distance between one of the two introduction lines and one subsidiary welding line is set to the distance of the subsidiary spacing, only one transverse wire is fed along this introduction line, the longitudinal wires together with the transverse wire are advanced towards the subsidiary welding line through a distance equal to the subsidiary spacing, and the transverse wire is welded to the longitudinal wire along the subsidiary welding line, the cycle being repeated as necessary.

Fundamentally it is therefore possible to produce by this process welded wire mesh of the given main spacing at a high rate of production by double-step welding, whereas in order to produce wire mesh with a subsidiary spacing, which is required much less often, the manufacture can be changed over in a very simple way and production proceeds by single-step welding. The lower rate of production in the latter case is hardly a disadvantage because the idle time which is customarily involved in changing over a double-step machine to a different transverse wire spacing is eliminated. Most simply, but not necessarily one of the main transverse welding lines forms the subsidiary welding line.

When the manufacture is changed over to the subsidiary spacing, the positions of the two main welding lines, one of which also forms the subsidiary welding line, may remain unchanged, and at least one of the insertion lines for the transverse wires is moved towards or away from the welding lines and the distance of advance is changed, to correspond to the subsidiary spacing.

In a particularly advantageous version of the method, during manufacture to the main spacing double-point welding orientated along the longitudinal wires is effected by the use of pairs of electrodes on one side of the plane of the wire mesh, and passive current bridges on the other side of the plane, whereas during manufacture to the subsidiary spacing single-point welding is effected by the use of single electrodes on the one side of the plane of the wire mesh and on the other side of this plane, instead of passive current bridges, lead-ins for active counter-electrodes.

The invention also includes a wire mesh welding machine capable of carrying out the above novel method, the machine having two rows of main electrodes extending across the direction of advance of the longitudinal wires, the rows of electrodes defining, in conjunction with counter-electrodes or passive current bridges, two welding lines running at right angles across the path of advance of the wire mesh and spaced apart by the amount of the main spacing, to permit simultaneous welding of two transverse wires, two introduction guides for transverse wires spaced apart by the amount of the main spacing, each guide spaced at a distance from a corresponding one of the welding lines equal to twice the main spacing, a conveyor for conveying, in use, two transverse wires, inserted at the guides, through a stroke equal to twice the main spacing to bring the two transverse wires to the welding lines, means permitting the subsequent setting of the distance between a subsidiary spacing welding line provided by one of the rows of main electrodes, or by an extra row of electrodes, and one of the insertion guides to a subsidiary spacing different from the main spacing, and means for adjusting the stroke of the conveyor to that of the subsidiary spacing.

Examples of the manner in which the invention can be put into effect are illustrated in the accompanying drawings, in which.

Figure 1A:
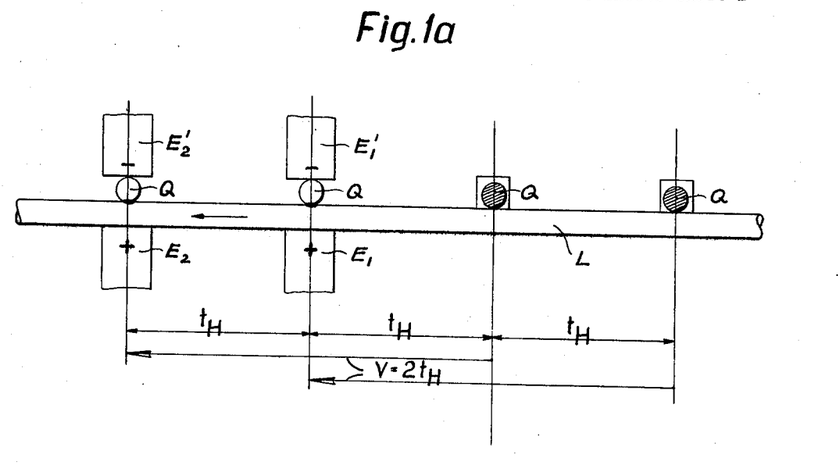
FIGURES 1a and 1b illustrate schematically the principle of the invention, assuming the use of two parallel rows of welding points, consisting of rows of electrodes and counter-electrodes.

In FIGURE 1a there will be seen two electrode pairs $E_1$, $E_1'$ and $E_2$, $E_2'$ arranged in series one pair after the other, the one pair separated from the other pair by a distance $t_H$ in the direction of advance of the longitudinal wire L, this distance $t_H$ being the main spacing for the transverse wires. In each pair of electrodes the two electrodes are on opposite sides of the plane of manufacture. For each longitudinal wire L there are two electrode pairs, the electrodes for the machine as a whole being arranged in the form of altogether four transverse rows extending across the machine at right angles to the intermediate plane (plane of the paper) to form two welding lines.

When the machine is operated to weld wire mesh with the main transverse wire spacing $t_H$, for each welding cycle two transverse wires Q are inserted, or "shot," into the machine from the side, in such a way that each transverse wire Q is at a distance $2t_H$ from the corresponding welding line (transverse row of electrode pairs). (In FIGURE 1a the transverse wires which have been shot into the machine in this way are represented as shaded cross-sections.) During the advancing movement each transverse wire is advanced, together with the longitudinal wires, through a distance of $V = 2t_H$. Thus at the end of this movement each transverse wire is positioned between the pairs of electrodes of an electrode row. In the welding operation the two electrodes of each pair co-operate and there results at each crossing point between a longitudinal wire and a transverse wire a weld produced by single-point welding.

Figure 1B:
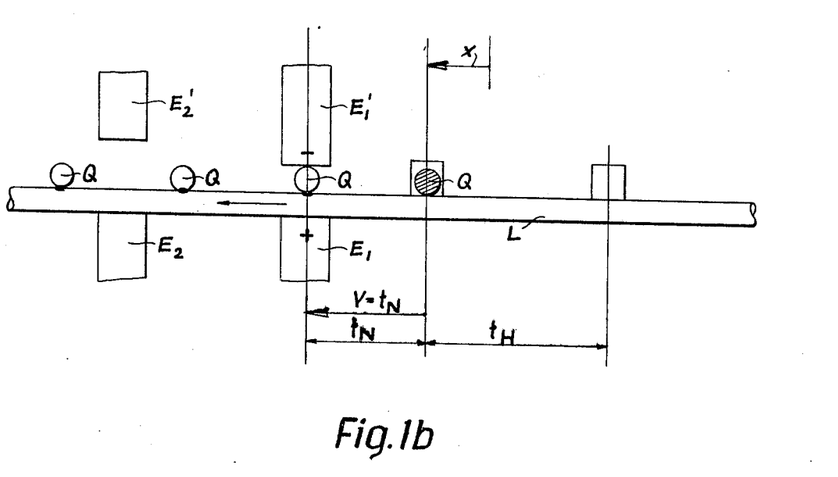

On the other hand, for welding with a transverse wire spacing $t_N$, that is to say a subsidiary wire spacing, the procedure, as illustrated in FIGURE 1b, is that at least one of the inserting positions or "shooting lines" for the newly introduced transverse wires is shifted through a distance $x$, so that this shooting line is now at the distance $t_N$ from the electrode pairs $E_1$, $E_1'$. In this case there is "shot" only one transverse wire Q for each operational cycle (as shown by the shaded cross-sectional in FIGURE 1b) and the advance is through the distance of the subsidiary spacing, that is to say through the distance $t_N$. The machine is now operating by the single-step process, whereby the electrode pair $E_1$, $E_1'$ is operative, whereas the electrode pair $E_2$, $E_2'$ is inoperative.

Figure 2A:
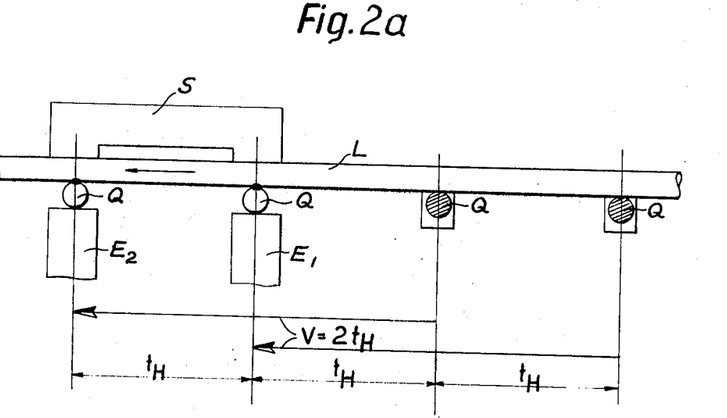
FIGURES 2a and 2b illustrate schematically the preferred machine which operates by the double-step method using double-point welding, and also operates by the single-step method using single-point welding.

FIGURE 2a corresponds to FIGURE 1a, except that the welding is in this case done by the two-point welding method. The transverse wires are spaced apart by the distance $t_H$, that is to say the main spacing distance. The two electrodes $E_1$ and $E_2$ do not in this case co-operate with individual, active counter-electrodes. The welding circuit passes over a passive bridge S, situated opposite the electrodes on the other side of the manufacturing plane, so that current flows through the two welding points in series. In this kind of operation the transverse wires Q are situated underneath the longitudinal wires L, so that the longitudinal wire does not short-circuit the two-point welding circuit.

Figures 2B, 2C:
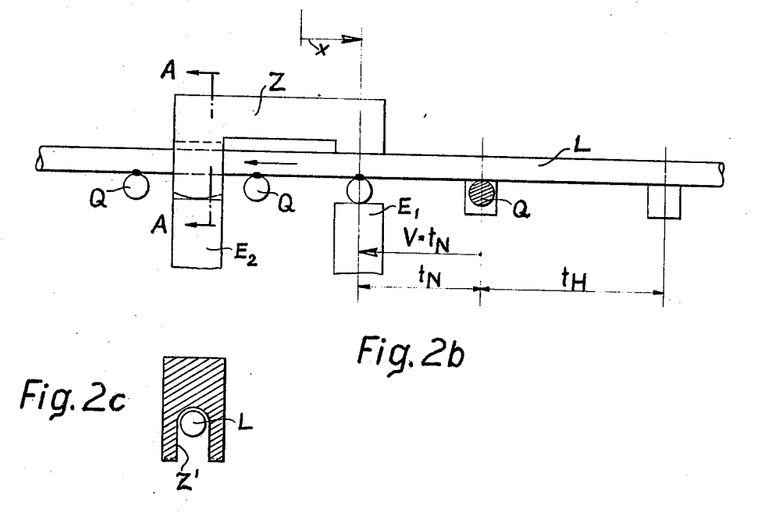
FIGURE 2c is a sectional view, taken on the line A—A of FIGURE 2b.

To change over from operation as represented in FIGURE 2a to a welding process involving subsidiary spacing of the transverse wires, as shown in FIGURE 2b, at least the transverse electrode line $E_1$ is shifted through the distance $x$ towards the transverse wire shooting line, represented in FIGURE 2b by the shaded wire cross-section Q. Here again only one transverse wire is fed in. The transverse wire is then advanced through the distance $t_N$, and this brings it over the electrode $E_1$. The passive current bridge S of FIGURE 2a is now replaced by a lead-in piece Z, which has a preferably integral end part which rests in contact with the electrode $E_2$ and has a recess Z' which bridges over the longitudinal wire L. The other end of the lead-in piece Z forms an active counter-electrode for the electrode $E_1$, so that the welding current passes from the electrode $E_2$ over the lead-in piece Z, circumventing the longitudinal wire L, passing over the crossing point between the two wires and so into the electrode $E_1$.

Figure 3:
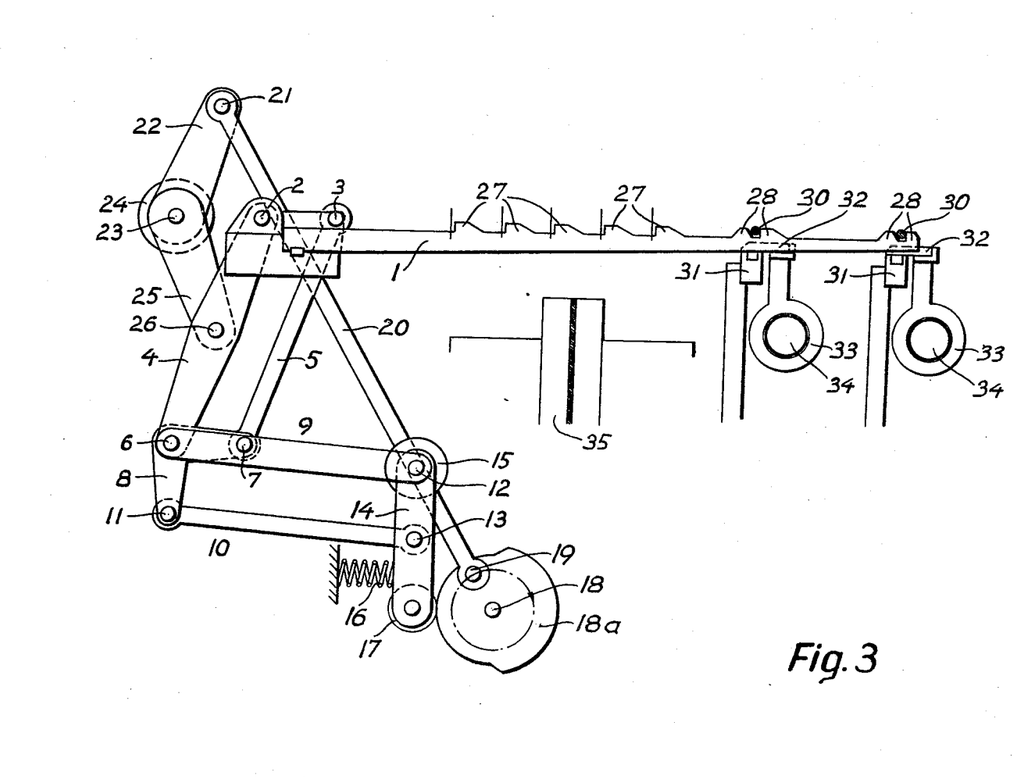
FIGURE 3 is a side elevation showing an advancing mechanism for the wire mesh.
Figures 4, 4A:
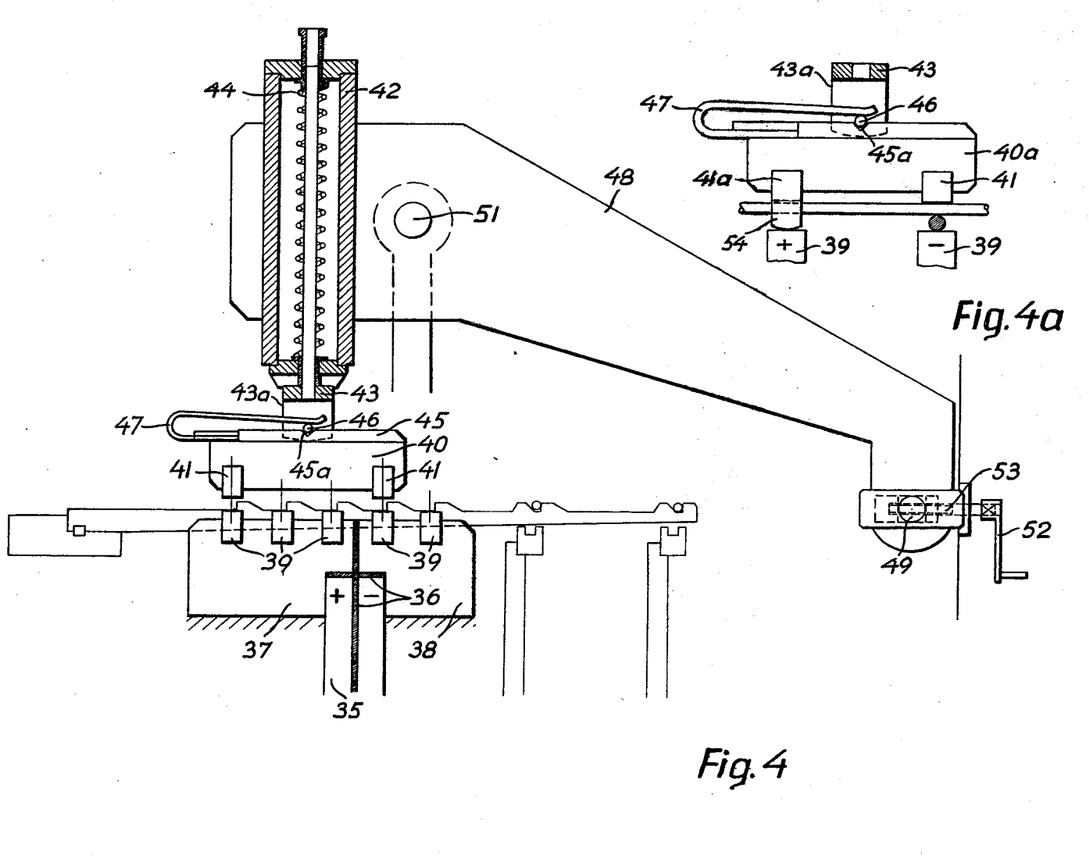
FIGURE 4 is a side elevation showing the arrangement of electrodes and their positions relative to the advancing mechanism.
FIGURE 4a is a detail of FIGURE 4 on a larger scale.
Figure 5A:
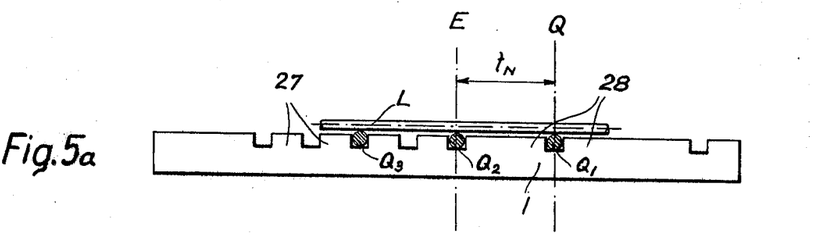
FIGURES 5a–5d are a series of elevations showing the movements of transport rails of the advancing mechanism.
Figure 5B:
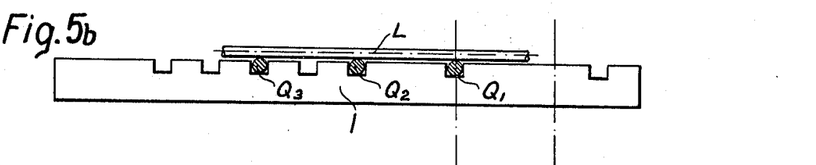
Figure 5C:
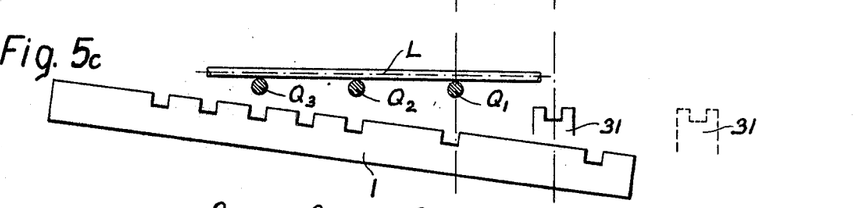
Figure 5D:
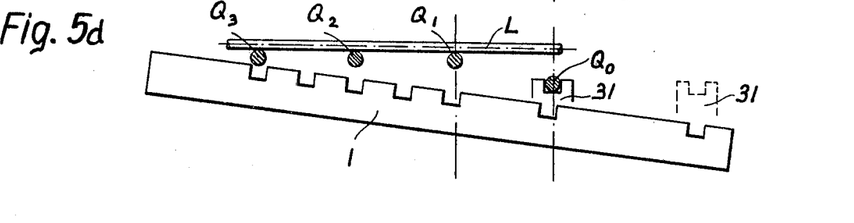

The mechanism shown in FIGURES 3 and 4 functions substantially as described in principle with the help of FIGURES 2a and 2b, and welds wire mesh in the simplest way alternatively either with the main transverse wire spacing $t_H$ or with any one of 7 different subsidiary spacings $t_N$, each of these subsidiary spacings being, like, the main wire spacing $t_H$, a multiple of a simple spacing.

FIGURE 3 represents the advancing mechanism of the machine and illustrates a feed and transport rail 1. To this transport rail 1 there is pivoted by a pin 2 a two-armed lever 4 and at the point 3 a connecting rod 5. The other end of the lever 4 is pivoted by a pin 6 to a bell crank lever 8. The other end of the connecting rod 5 is pivoted at 7 to the end of a first arm of the lever 8. This system forms a parallel motion linkage. A second parallel motion linkage is formed by two rods 9 and 10. The rod 9 is pivoted at one end to the pivot pin 6 of the lever 8, and at the other end to a shaft 12. The rod 10 is pivoted at one end to the end of the second arm of the lever 8, at the point 11, and at the other end to a pivoted lever 14, at the point 13. The shaft 12 is mounted in a stationary bearing 15. The rod 9 and the lever 14 can pivot relative to each other and also relative to the shaft 12.

At the lower end of the lever 14 there is a roller 17, and the lever 14 is under the influence of a thrust spring 16 which tends to push the roller 17 against the surface of an edge cam 18a mounted on a driven shaft 18.

A crank pin 19, mounted on the cam wheel 18a, or on a crank mounted on the shaft 18, drives a connecting rod 20, the other end of which is pivoted to a pin 21 mounted on a lever 22.

A shaft 23 is mounted rotatably in a stationary bearing 24, and on this shaft 23 are fixed unrotatably the lever 22 and a lever 25, so that pivoting movement of the lever 22 is positively transmitted to the shaft 23 and from there to the lever 25.

The other end of the lever 25 is pivoted by a pivot pin 26 to the lever 4. The distance between the pin 2 and the pin 26 is the same as that between the shaft 23 and the pin 26.

The transport rail 1 has on its upper edge hook transportation members 27 for advancing the wire mesh. The upper edge of the conveying rail 1 also has conveying members, in the form of pairs of hooks 28 for advancing new transverse wires to the welding points. When the machine is in operation the transverse wires 30, which have newly been fed in from the side, engage in the slots between the two hooks 28 of each pair of hooks, that is to say each transverse wire is first shot into one of two guides 31 and is subsequently received by the corresponding slot between a pair of hooks 28.

Each receiver guide 31, which receives the slot in transverse wire, is closed at the top by a retainer 32 mounted on a retainer support 33, which is itself mounted on a shaft 34. In the operation of the machine as soon as a transverse wire 30 has been lifted by the conveyor rail 1 out of the guide slot 31, the shaft 34 rotates through a limited angle in the clockwise direction and the retainer support 33 lifts the retainer 32 away from the guide slot 31, releasing the transverse wire 30.

FIGURE 3 also shows the two electric busbars 35, which are shown in this figure only in order to indicate their positions relative to the other parts of the machine, in conjunction with FIGURE 4.

As shown in FIGURE 4 the busbars 35 support electrode supports 37, 38 which are insulated from each other by insulating strips 36 and are connected to the busbars in such a way that the one electrode support 37 is connected to the positive busbar, whereas the other electrode support 38 is connected to the negative busbar. On each electrode support there are mounted several contact electrodes 39 disposed one behind the other in the direction of advance of the wire mesh. These are the welding electrodes proper.

Above the welding electrodes there is a passive current bridge 40, to which the attached two contact bodies 41. The electrode supports 37, 38 and the current bridges 40 are arranged on the machine in rows extending transversely (at right angles to the plane of the drawing in FIGURE 4) in number at a spacing corresponding to that of the longitudinal mesh wires. Extending over the entire width of the machine there is a housing 42 which has for each current bridge a thrust spring 44, which tends to push a current bridge carrier 42 downwards, the current bridge 43 being mounted slidably in the bottom of the housing 42.

Each current bridge carrier 43 has two cheeks 43a standing out sideways and having rounded lower surfaces. A pin 46 runs across between these cheeks. To the upper surface of each current bridge 40 there is attached a rail 45 of width equal to the distance between the cheeks 43a. In the middle of each rail 45 there is a V-notch 45a over which a leaf-spring 47, attached to the current bridge 40, engages.

In order to install a current bridge 40 in the machine, the current bridge is pushed forwards, bringing the rail 45 between the two cheeks 43a of the current bridge carrier 43, whereby the end of the spring 47, which is slightly bent upwards, is lifted by the pin 46. Pushing the current bridge 40 still further forwards brings the pin 46 into engagement with the V-notch in the rail 45, whereby the current bridge is positively located in place. Thus the current bridges can be replaced very easily, there being no screwed connections to unscrew and screw up again.

When changing over to single-step operation, using the single-point welding method, the passive current bridge 40 (corresponding to the current bridge S in FIGURE 2a), which is used for double-step operation by the double-point welding method, is replaced by a lead-in piece 40a (corresponding to the lead-in piece Z in FIGURE 2b). The lead-in piece 40a, as shown in FIGURE 4a, has two different contact bodies 41 and 41a. The contact body 41a has a longitudinal groove 54 which is large enough to allow the thickest longitudinal wire to pass through without making electrical contact. When this lead-in piece 40a is in operation the current flows from the positive electrode 39 up over the contact body 41a and over the lead-in piece 40a and down over the contact body 41 and over the crossed wires to the negative electrode 39. The lead-in piece 40a with its two contact bodies forms a changeover means. The contact surface of the contact body 41a is rounded in shape so as to ensure that good electrical contact is obtained even when the total thickness of the two wires has decreased, during the welding process, by penetration of the wires into each other by plastic deformation, causing the lead-in piece 40a to assume an inclined attitude.

The lead-in piece 40a is attached, as shown in FIGURE 4a, to the current bridge carrier 43 by the same attachment means as those used for the current bridge 40. The housing 42, which extends over the entire width of the machine, is in the form of a hollow box beam and is called the electrode beam. This beam takes the bending stresses resulting from the pressure applied to the current bridges. The electrode beam 42 is itself supported by two supporting arms 48, each of which is pivoted at a point 49 on a device which permits longitudinal adjustment. Tension rods 50 are pivoted at 51 to the supporting arms 48. The other ends of the tension rods 50 are mounted on eccentrics (not shown in the drawings), which periodically lift and lower the supporting arms 48 and the electrode beams 42, producing a rhythmic up and down movement of these parts, to the effect that the current bridges move down at predetermined time intervals and come to rest on the wire mesh, closing the electric circuit, and then lift off again releasing the wire mesh for the mechanical advancing movement. By means of a handwheel 52 and a threaded spindle 53 the supporting arms 48, together with all the parts attached to them, can be adjusted in position in the longitudinal direction of the wire mesh within a limited range of adjustment.

The machine described above functions as follows:

The cam shaft 18 and the crank pin 19 are driven by an electric motor provided for driving the entire machine. The connecting rod 20, which is pivoted on the one hand to the crank pin 19 and on the other hand to the lever 22, gives an oscillating rotary movement to the lever 22. As the levers 22 and 25 are rigidly fixed to the shaft 23 which is mounted in the fixed bearing 24, the oscillating rotary movement is transmitted to the lever 25. Consequently the pin 26 which connects the lever 25 to the lever 4, also performs an oscillating rotary movement, the centre of which is the axis of the shaft 23.

Due to the fact that the points 2, 3, guided by the lever 4 and the connecting rod 5, must always remain parallel to the first arm of the lever 8, and due to the fact that the second arm of the lever 8, guided by the rods 9 and 10, must remain parallel to the lever 14, the rotary movement of the pin 26 gives the points 2 and 3, and thus the conveying rail 1, a straight line movement in the direction of the longitudinal axis of the conveyor rail 1, provided that the lever 14 does not change in position. Moreover due to the fact that the distance between the point 23 and the point 26 is the same as that between the point 2 and the point 26, this straight line movement always takes place at the same height.

As soon as the wire mesh has been pulled forwards far enough by the hooks 27, and at the same time the newly introduced transverse wires 30 have reached the correct position between the welding electrodes 39 and the contact elements 41 of the current bridges 40, the cam 18a mounted on the cam shaft 18 pushes the roller 17 towards the left, against the influence of the spring 16, pivoting the lever 14 about its axis 15. The second arm of the lever 8 follows this pivoting movement, under the influence of the rods 9 and 10, with the result that the connecting rod 5 and the conveying rail 1 also pivot through the same angle. The linkage system and the position of the cam 18a relative to the crank pin 19 are such that this pivoting movement begins when the point 26 on the lever 4 has approximately reached its outermost limiting position, that is to say when the crank pin 19 has reached its lower dead-centre point after the first half-turn of the cam shaft 18.

During the second half-turn of the cam shaft 18 the point 26 on the lever 4 rotates counter-clockwise, causing the conveying rail 1, which is now inclined at an angle, to move in a direction parallel to itself back into its initial position. Just before the crank pin 19 reaches upper dead-centre position the roller 17 runs off the raised portion of the cam 18a, so that the entire linkage system returns to its initial position, under the influence of the spring 16. However just before this final pivoting movement begins the shafts 34, and with them the retainer supports 33, are pivoted by a control mechanism, which is not shown in the drawings, clockwise until the retainers 32 have come clear of the upper openings of the transverse wire guides 31, and consequently the conveying rail 1, which is now pivoting upwards, lifts the newly introduced transverse wires 30 up out of the guides 31.

As soon as the transverse wires have left the guides 31, the retainers 32 once more close the tops of the guide slots 31, so that now a new transverse wire can be shot in.

FIGURE 5 shows diagrammatically the individual phases in the movement of a conveying rail, for the case where welding is done by the single-step process to give a subsidiary transverse wire spacing $t_N$. In this figure the welding electrodes are situated on the vertical line E, and the new transverse wires are shot in on the vertical line Q. The conveying hooks 27, 28 are of different construction in FIGURE 5, compared to those shown in FIGURES 3 and 4. Considering first the positions of the conveying rail shown at (a), the transverse wire $Q_3$ has already been welded to the longitudinal wire L. The transverse wire $Q_2$ is in position ready for welding, and the transverse wire $Q_1$ has just been accepted by the transport rail. Referring now to the position (b), the conveying rail 1 has just performed its straight line movement towards the left, bring the transverse wire $Q_1$ into the welding position. The transverse wire $Q_2$ has been welded to the longitudinal wire L. Referring now to position (c), the right-hand end of the conveying rail 1 has been lowered and has thus been separated from the welded wire mesh. In position (d) the conveying rail has been moved towards the right and a new transverse wire $Q_0$ has been shot into the guide 31. In the next movement the right-hand end of the conveyor rail rises once more, bringing the rail into the position shown at (a), whereby the newly introduced transverse wire $Q_0$ is lifted out of the guide 31 and brought up to the level of the already welded wire mesh and thus into contact with the longitudinal wire L. The cycle then begins again.

The welding machine must of course be so constructed that adjustment can be made to give different advancing distances ($V=2t_H$ or $V=t_N$). The necessary adjustment mechanism, which any machine constructor will understand very well, is not shown in the drawings. However, for the sake of completeness it may be mentioned here that for this purpose the radius of action of the crank pin 19 can be made adjustable by means of a spindle, and the connecting rod 20 can be given a turnbuckle with two screwthreads running in opposite directions for adjusting the initial position of the conveying rail 1. As a further possibility the connecting rod 20 can be made in two parts and an adjustable slider inserted between the two.

Figures 6A, 6B:
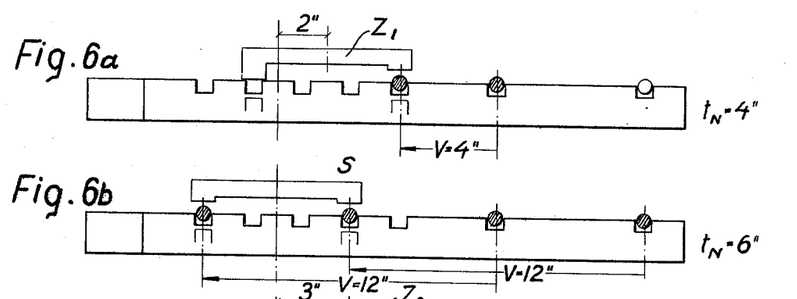
FIGURES 6a–6g show in side elevation how the transport rails can be used for manufacturing wire mesh of different transverse wire spacing by suitably choosing the insert lines for the transverse wires, the welding lines formed by the electrodes and the distance of advance of the transport rails.
Figures 6C, 6D:
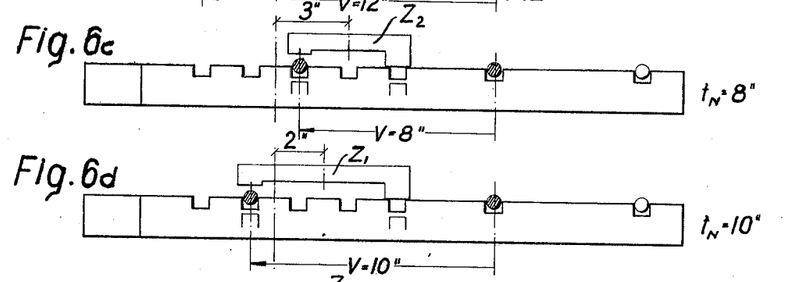
Figures 6E, 6F, 6G:
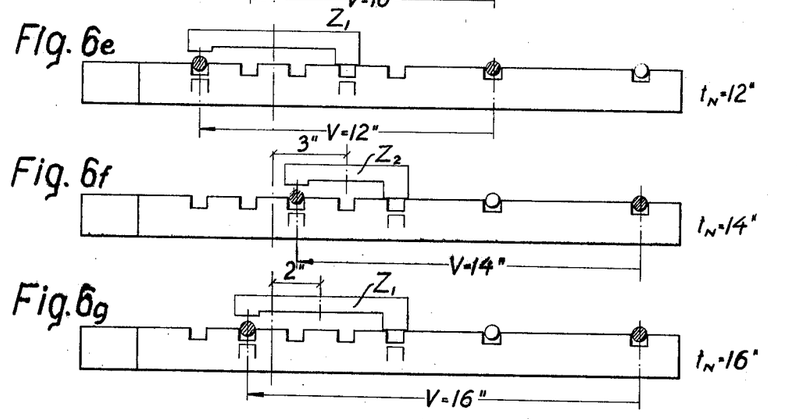

FIGURE 6 shows diagrammatically how wire mesh can be manufactured on the machine described above with different transverse wire spacings, which are harmonics of a main spacing, which can for example be 2″. In the example shown in FIGURE 6 the machine can manufacture mesh with transverse wire spacings 4″, 6″, 8″ . . . up to 16″. The main spacing in this case is $t_H=6″$, all the other spacings being subsidiary spacings. When the machine is producing main spaced mesh it operates in double-step production with double-point welding, in order to produce at the highest rate, whereas when producing subsidiary spaced mesh the machine operates by the single-step method with single-point welding.

To set up the machine for subsidiary spaced welding the current bridge S (corresponding to the current bridge 40 in FIGURE 4) is replaced by the load-in pieces $Z_1$, $Z_2$ (corresponding to the lead-in piece 40a in FIGURE 4a). The arrangement of conveying hooks on the conveying rail 1 is shown in FIGURE 5.

In the example shown in FIGURE 6 there are used 6″ current bridges equipped with contact bodies 41, both of the same kind, for welding the main spacing $t_H=6″$; there are used 6″ lead-in pieces $Z_1$ with diffferent contact bodies 41, 41a, for welding the subsidiary spacings $t_N=4″$, 10″, 12″ and 16″; and there are used 4″ lead-in pieces $Z_2$ with different contact bodies 41, 41a, for welding the subsidiary spacings $t_N=8″$ and 14″.

FIGURE 6 shows at the positions (a) to (g) how the welding programme described in the paragraph above can be performed by suitably choosing the advancing stroke of the conveyor rails, by shifting the current bridge carrier longitudinally, by exchanging current bridges and lead-in pieces, and by using either one or both the transverse wire guides as required. Here again shaded circles represent transverse wires, whereas empty circles represent stationary (unused) transverse wire guiding devices.

For the special case of mesh welding with the subsidiary spacing $t_N=4″$ the movements are as described for FIGURE 5. For all other spacings the movements are based on the advancing distance V shown in FIGURE 6.

As there are only two handwheels to be actuated, that is to say the handwheel 52 and another handwheel which is not shown in the drawings, but which could for example be an adjustable slider on the connecting rod 20, for longitudinal adjustment of the positions of the current bridges and lead-in pieces, and for adjusting the distance of advance of the welded wire mesh, and in view of the fact that the current bridges and lead-in pieces can be exchanged by a movement of the operator's hand, it is evident that the machine can be changed over very rapidly from one transverse wire spacing to another in the fulfilment of the production programme.

Numerous variations on the example described here can be used within the frame of the invention, for example the conveying hooks and/or notches in the conveyor rails can if desired by adjustable, whereby there is in this case obtained a continuous variability of the subsidiary spacing.

We claim:
1. A method of sequentially manufacturing a first length of welded wire mesh having a first main transverse wire spacing, and a second length of welded wire mesh having a subsidiary transverse wire spacing different from said main transverse wire spacing, said method comprising the steps of simultaneously introducing first and second transverse wires along first and second lines of insertion mutually spaced by said main spacing, with said first line of insertion at a distance of twice said main spacing from a first main transverse welding line and with said second line of insertion spaced at a distance of twice said main spacing from a second main transverse welding line, advancing said longitudinal and transverse wires towards said main welding lines through a distance of twice said main spacing, and welding said first and second transverse wires to said longitudinal wires along said first and second welding lines and repeating the cycle as necessary subsequently re-setting the distance between one of said insertion lines and one subsidiary welding line to the distance of said subsidiary spacing, feeding only one transverse wire along said one insertion line, advancing said longitudinal wires and said one transverse wire towards said subsidiary welding line through a distance equal to said subsidiary spacing, welding said one transverse to said longitudinal wires along said subsidiary welding line, and repeating the cycle a necessary from the feeding of said one transverse wire along the said one insertion line.

2. A method according to claim 1, wherein one of said main welding lines also forms said subsidiary welding line and said distance between said one insertion line and said subsidiary welding line is re-set by maintaining the positions of said main welding lines constant and moving at least one of said insertion lines towards or away from said main welding lines.

3. A method according to claim 1, wherein one of said main welding lines also forms said subsidiary welding line and said distance between said one insertion line and said subsidiary welding line is re-set by maintaining the positions of said insertion lines constant and moving at least one of said main welding lines relatively to said insertion lines.

4. A wire mesh welding machine comprising first and second transverse rows of main electrodes spaced apart by a main transverse wire spacing, first and second introduction guides for transverse wires spaced apart by said main spacing with said first guide spaced a distance of twice said main spacing from said first electrode row and said second introduction guides spaced at a distance of twice said main spacing from said second electrode row, a conveyor adapted to convey said first and second transverse wires inserted at said first and second guides through a stroke equal to twice said main spacing to bring said first and second transverse wires to said first and second electrode rows, means permitting the subsequent setting of the spacing of a subsidiary electrode row and one of said introduction guides by a distance equal to a subsidiary transverse wire spacing different from said main spacing, and means for adjusting the stroke of said conveyor to that of said subsidiary spacing.

5. A machine according to claim 4, wherein said first and second introduction guides are fixed and means are provided for adjusting said distance between said subsidiary electrode row and said one introduction guide.

6. A wire mesh welding machine comprising first and second transverse rows of main electrodes spaced apart by a main transverse wire spacing, first and second introduction guides for transverse wires spaced apart by said main spacing with said first guide spaced a distance of twice said main spacing from said first electrode row and said second introduction guides spaced at a distance of twice said main spacing from said second electrode row, a conveyor adapted to convey said first and second transverse wires inserted at said first and second guides through a stroke equal to twice said main spacing to bring said first and second transverse wires to said first and second electrode rows, means permitting the subsequent setting of the spacing of a subsidiary electrode row and one of said introduction guides by a distance equal to a subsidiary transverse wire spacing different from said main spacing, and means for adjusting the stroke of said conveyor to that of said subsidiary spacing, wherein said first and second introduction guides are fixed and means are provided for adjusting said distance between said subsidiary electrode row and said one introduction guide, comprising pairs of main electrodes spaced apart in said longitudinal direction, correlated passive current bridges situated on said side of said plane of said mesh remote from said main electrodes to form a double point welding path for said main spacing welding, a bus bar on said main electrode side of said plane, counter electrodes on the other side of said plane, and lead-in pieces selectively interchangeable with said current bridges and extending from said bus bar to said counter electrodes, said counter electrodes and further electrodes defining a single point welding path.

7. A machine according to claim 6, comprising a transverse beam, means mounting said current bridges and said lead-in pieces in an easily exchangeable manner on said beam and means adapted to adjust the position of said beam in said longitudinal direction.

8. A machine according to claim 7, further comprising spring stirrups adapted to hold said current bridges and said lead-in pieces, an attachment pin on said transverse beam, upper wall parts of said current bridges and said lead-in pieces providing notches thereon whereby said spring stirrups engage said attachment pin received in said notches.

9. A machine according to claim 4, further comprising parallel conveying rails extending in said longitudinal direction, front and rear ends of said conveying rails, a common drive means adapted to actuate said front ends to move said rails back and forth in said longitudinal direction whereby during a return stroke of said rails said rear ends are lowered and subsequently raised again, and said conveying rails projecting freely from said drive means and having notches spaced by said main spacing for receiving transverse wires from said insertion guides and also having conveying members mutually spaced in simple fractions of said main spacing for engaging transverse wires welded to said longitudinal wires.

10. In a machine, as claimed in claim 4, and change-over means operable for rendering effective only the electrodes of said subsidiary electrode row and rendering the other electrodes ineffective when the machine is operated at said subsidiary wire spacing.

References Cited
UNITED STATES PATENTS 3,188,444    6/1965    Ramstein _____________ 219—56
3,286,072    11/1966    Ritter et al. ___________ 219—56

JOSEPH V. TRUHE, Primary Examiner

B. A. STEIN, Assistant Examiner

U.S. Cl. X.R.
140—112; 219—58